(No Model.) 4 Sheets—Sheet 1.
G. R. HUFF & G. H. VERNON.
SAW FILING MACHINE.
No. 505,626. Patented Sept. 26, 1893.
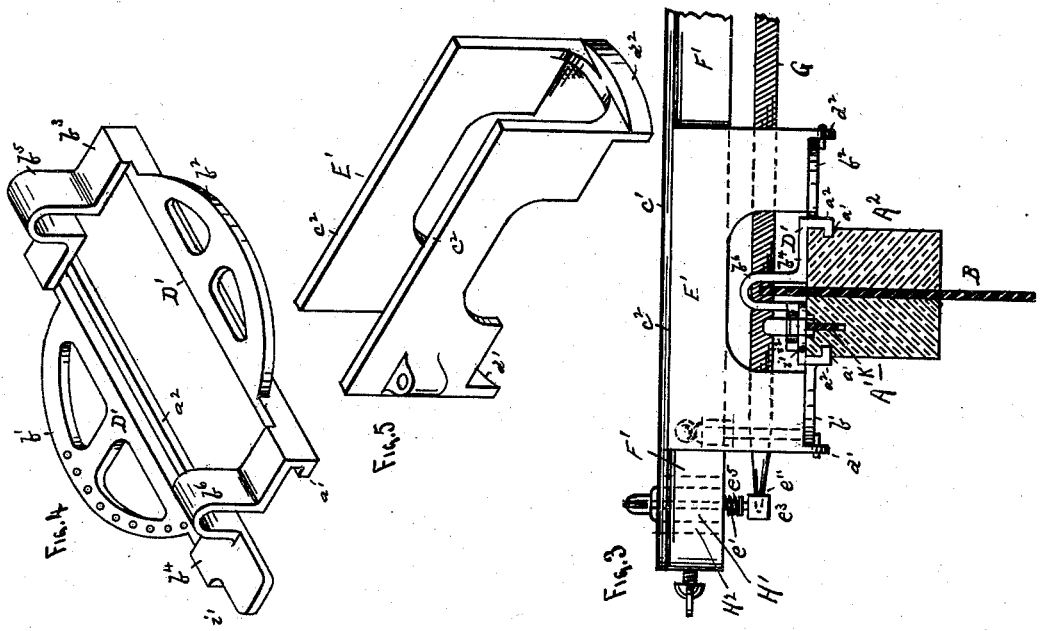
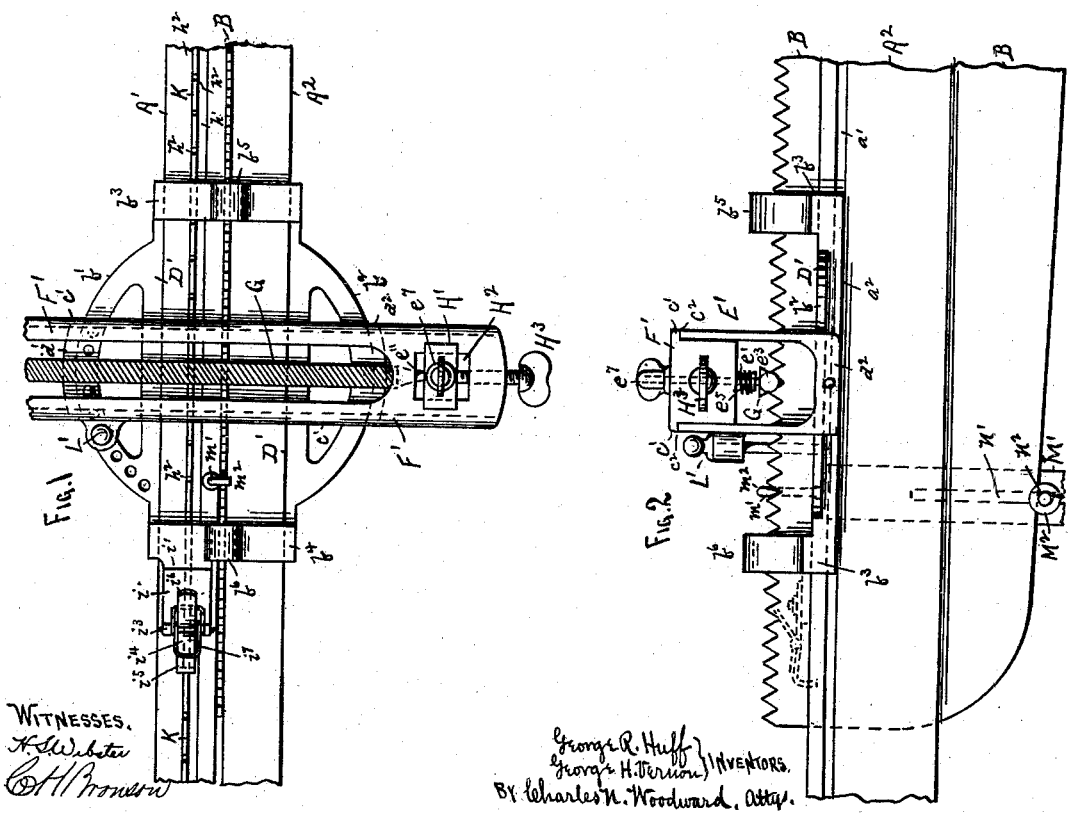

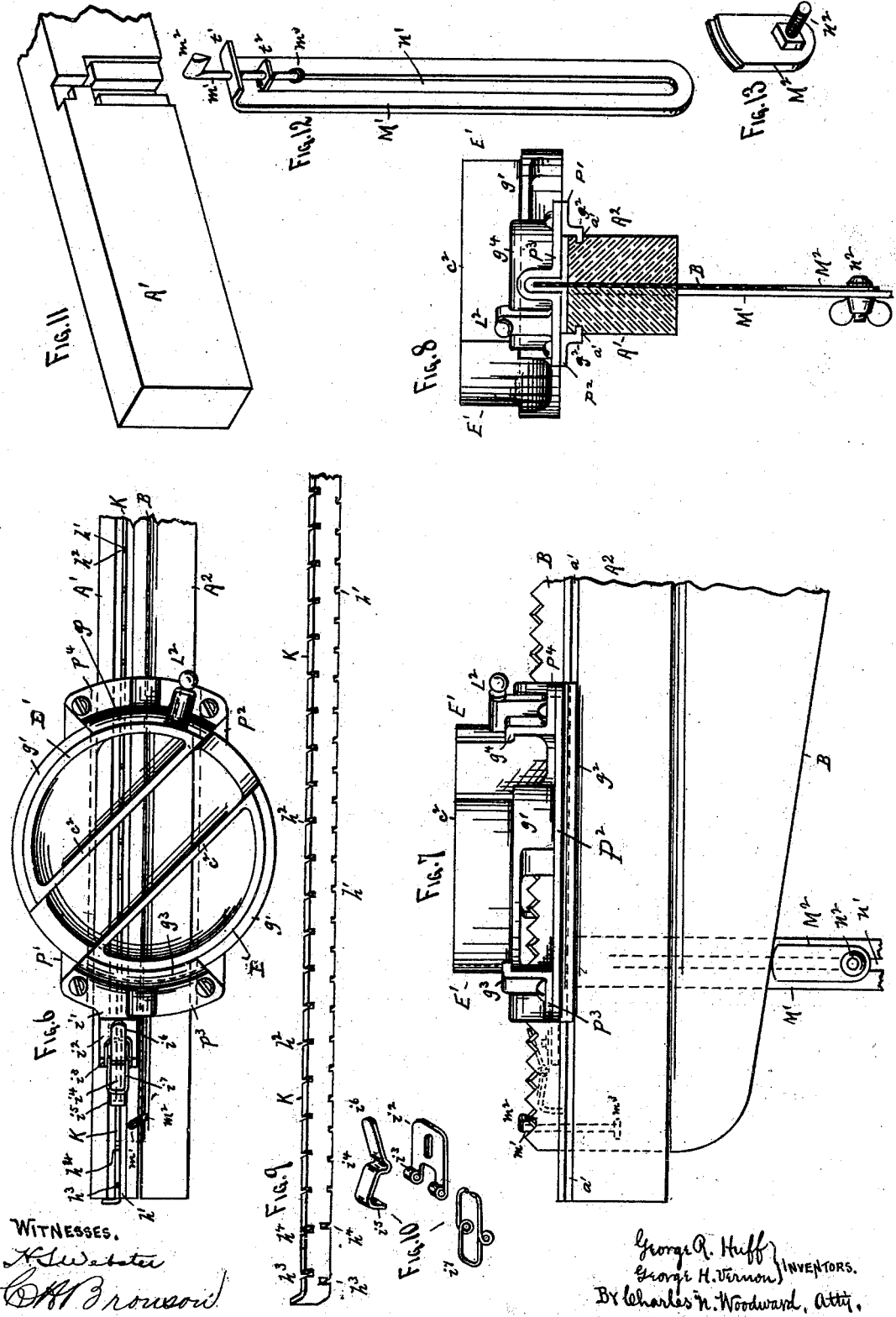

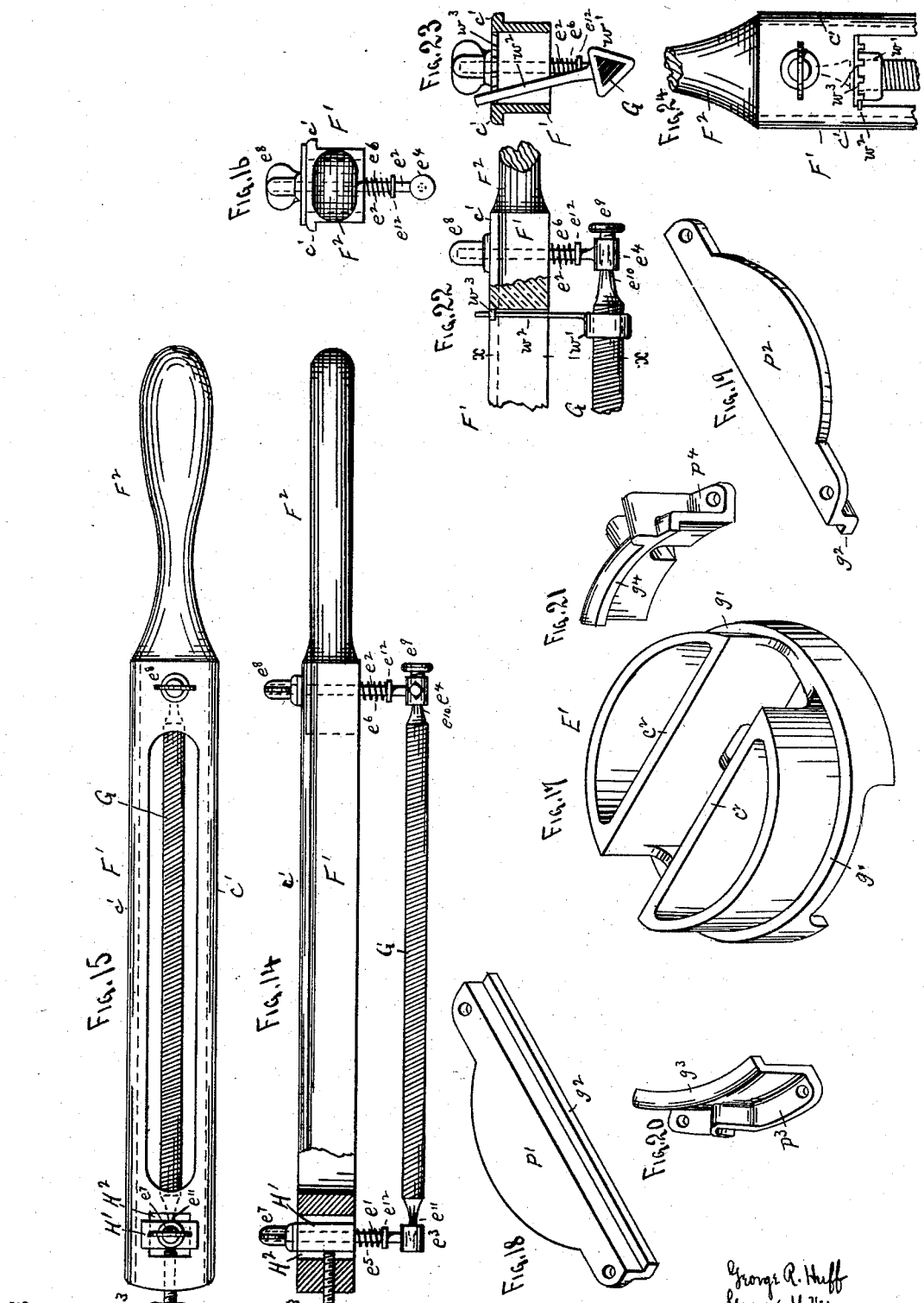

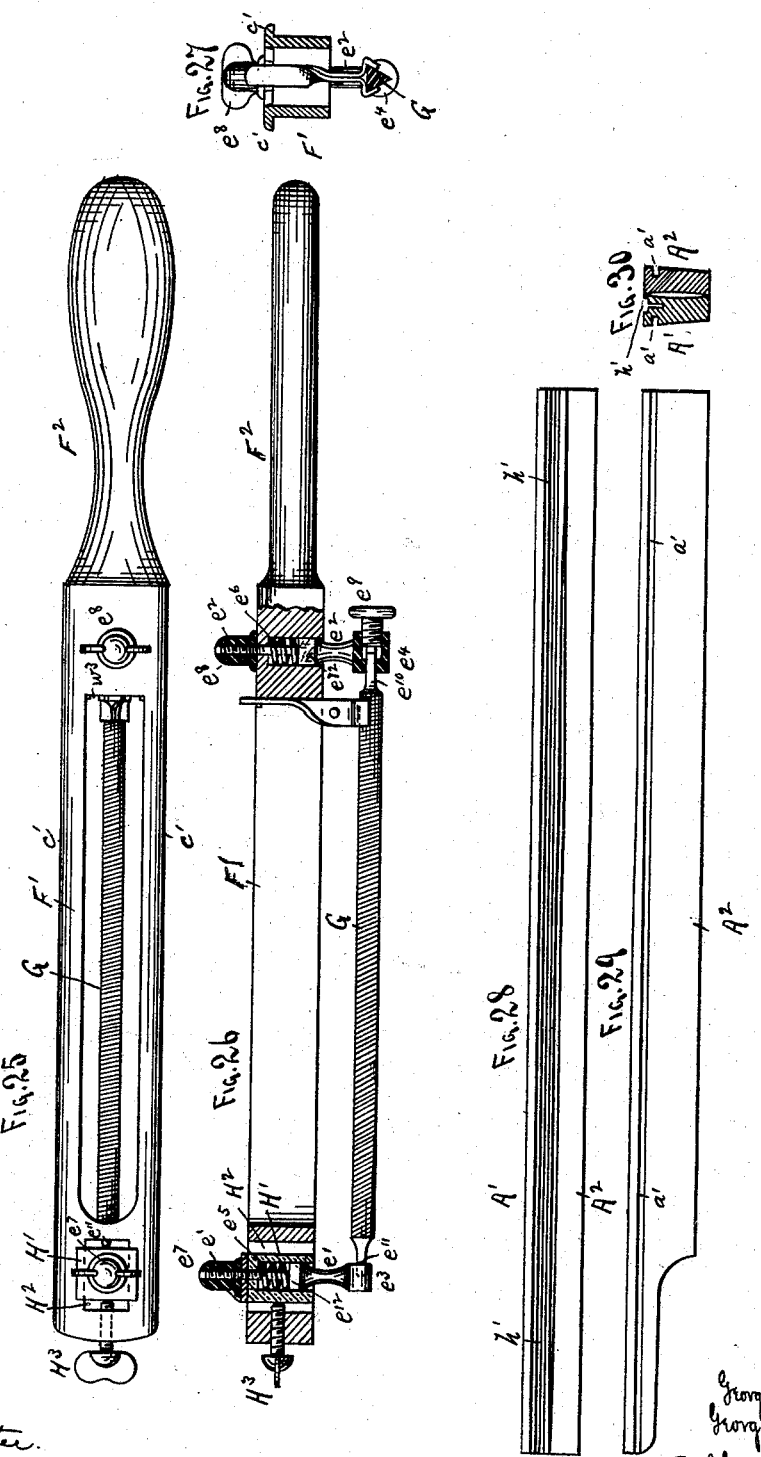

UNITED STATES PATENT OFFICE.

GEORGE R. HUFF AND GEORGE H. VERNON, OF ST. PAUL, MINNESOTA.

SAW-FILING MACHINE.

SPECIFICATION forming part of Letters Patent No. 505,626, dated September 26, 1893.

Application filed February 13, 1893. Serial No. 462,012. (No model.)

*To all whom it may concern:*

Be it known that we, GEORGE R. HUFF and GEORGE H. VERNON, both citizens of the United States, and both residing at St. Paul, in the county of Ramsey and State of Minnesota, have jointly invented certain new and useful Improvements in Saw-Filing Machines, of which the following is a specification.

This invention relates to saw filing machines, and consists in the construction, combination, and arrangement of parts as hereinafter shown and described, and specifically pointed out in the claims.

In the drawings,—Figure 1 is a plan view. Fig. 2 is a side elevation, and Fig. 3 is an end elevation, in section through the clamps, of the filing machine, showing the construction of the file guide and holder, and a portion of the clamps, with a section of a saw shown in position therein. Fig. 4 is a perspective view of the sliding base frame of the file guide, detached. Fig. 5 is a perspective view of the file holder guide, detached. Figs. 6, 7 and 8 are views similar to Figs. 1, 2 and 3, illustrating a slight modification in the construction. Fig. 9 is a perspective view of a section of one of the regulator strips. Fig. 10 represents the different parts of the regulator catch, disconnected. Fig. 11 is a perspective view of a portion of one end of one of the saw clamps. Figs. 12 and 13 are perspective views of the saw gage mechanism, detached. Fig. 14 is a side view. Fig. 15 is a plan view, and Fig. 16 is an end view, of the file holder. Fig. 17 is a persective view of the file holder guide as employed in the construction shown in Figs. 6, 7 and 8. Figs. 18, 19, 20, and 21 are detached perspective views of the parts forming the sliding base of the file holder guide as employed in the construction shown in Figs. 6, 7, and 8. Fig. 22 is a detached view of one end of the file holder, illustrating a modification in the manner of adjusting the file. Fig. 23 is a cross section on the line $xx$ of Fig. 22. Fig. 24 is a plan view of the portion shown in Fig. 22. Fig. 25 is a plan view. Fig. 26 is a longitudinal sectional side view, and Fig. 27 is a cross sectional view of the file holder, illustrating a slight modification in the manner of holding and adjusting the file. Fig. 28 is a plan view, Fig. 29 is a side elevation, and Fig. 30 is a cross sectional view, on a reduced scale, the saw clamps illustrating more fully some novel features of the construction.

This invention consists of two clamp bars between which the saw is held by a vise or other suitable means, a plate or frame sliding along the upper edge of the clamp bars, a holder frame or guide for a file holder and swiveled upon the sliding plate, and a file holder fitting into this guide or holder frame, the swiveling of the holder frame permitting the teeth of the saw to be filed at any desired angle.

In the drawings we have shown two similar but equivalent constructions, either of which may be used without departing from the spirit of our invention.

In Figs. 1, 2, and 3 is shown a construction wherein the swiveled file holder guide frame is adapted to operate over the outside of the base frame, while in Figs. 6, 7 and 8 the swiveled frame is shown arranged to operate beneath guards on the base frame.

$A'$ $A^2$ represent the saw clamp bars between which the saw B is held in an ordinary vise, or by other suitable device, and with ways or guide grooves $a'$ in which ribs $a^2$ upon a base plate or frame $D'$ fit, so that while the base frame will freely move along the clamps, it cannot be removed therefrom, except by running it off from the ends of the clamp bars.

The base frame is formed with projecting wings $b'$ $b^2$ one on each side, the outer rims of the wings being segments of a circle, as shown. At its ends the base frame is formed with cross bars $b^3$ $b^4$, having raised central portions $b^5$ $b^6$ to bridge the saw B when held between the clamp bars, as shown.

$E'$ represents the file holder guide frame formed with ribs $d'$ $d^2$, inclosing opposite portions of the segmental rims of the wings $b'$ $b^2$, as shown, thus forming the swivel feature of the connection between the parts $D'$ and $E'$. The main upper surface of the base frame is substantially in line with the upper surfaces of the clamp bars $A'$ $A^2$, so that the lower surface of the file holder guide frame $E'$ will likewise come close to the upper surface of the clamp bars, the object to be hereinafter described.

The file holder consists of an oblong open frame F' having a handle F² at one end, and with two screw rods e' e² set in its ends, as shown, and adapted to fit between the sides of the swiveled frame E', as shown in Fig. 1. By forming the holder frame F' open through the center, the file and the teeth being acted on can be seen by the operator, which is a very desirable advantage.

Upon the lower ends of the screw rods e' e² are attached, or formed in one piece therewith, small sockets e³ e⁴ adapted to support the ends of a file G, as shown, and with coiled springs e⁵ e⁶ surrounding the rods between the sockets and the lower surface of the holder, and with thumb nuts e⁷ e⁸ upon the upper ends of the screw rods above the holder, by which the screw rods may be run up or down. By this simple means the file may be readily adjusted higher or lower by turning the nuts e⁷ e⁸ up or down, while at the same time the presence of the springs e⁵ e⁶ permits the file to yield if the pressure is too great, and thus avoid any danger of undue friction.

The socket e⁴ is provided with a set screw e⁹, and the file G is formed with a shank e¹⁰ of uniform size which is adapted to pass entirely through the socket e⁴, when the file is first inserted, so that the end e¹¹ of the file may be inserted into the socket e³ and then the set screw set up against the end of the file so as to hold the latter firmly in place between the sockets. By this means if the file is set too deeply, or if a high tooth in the saw is met with, the file will yield and avoid undue wear, or the danger of the breakage of any of the parts. At one end of the file holder the screw rod passes upward through a block H' fitting into a slot H² in the holder frame, and adapted to be adjusted by a set screw H³, so that any variation in the length of the file may be compensated for.

In Figs. 22, 23, and 24 we have shown another method of adjusting and holding the file, consisting in a collar w' inclosing the file G, and with a spring arm w² rising therefrom, and adapted to fit into notches w³ on the holder frame F'. By adjusting the spring arm along the notches w³ the file will be held at any desired angle, or readily adjusted to change the angle to fit any shape of saw tooth.

In Figs. 25, 26, and 27 is shown a slight modification in the manner of arranging the screw rods e³ e⁴, consisting in so forming them that the springs e⁵ e⁶ are entirely within the body of the holder F', and with shoulder e¹² moving up and down within the holder, so that the screw rods are supported and prevented from moving laterally, thereby greatly increasing the steadiness of the operation of the file.

We have shown coiled springs surrounding the screw rods e³ e⁴, but other forms of springs, rubber washers, or other similar suitable material may be substituted.

Fitting into a groove in one of the bars A' is a thin metal strip K, the upper edge of the strip preferably coming flush with the upper surface of the clamp bars, and with channels h' cut into the upper surface of the clamp bar on each side of the strip, as shown. This strip is formed with notches h², (see Fig. 9,) in its edges equal in their distances apart to every other tooth of the saw to be filed, both edges of the strip being provided with a separate set of notches corresponding to different sizes of the saw teeth, so that one strip will do duty for two sizes of saw. The strips K will be arranged so as to be adjusted endwise the distance of one tooth or more of the saw to which its notches correspond, (thus each strip having two endwise adjustments, if it is provided with two sets of notches h² as in Fig. 9.) This adjustment can be made in any desired manner, but the very simple method shown in Fig. 9 is an acceptable one, consisting in forming in the opposite sides of the strip K from the notches which it is designed to adjust, two other notches h³ h⁴, with a space between them of one and one half teeth, and adapted to set over a cross pin in the space for the strip within the cavity in the clamp bar, so that when one set of the teeth has been filed, that is to say every other tooth at one angle, by merely lifting the plate K and moving it along and setting the other notch h³ or h⁴, as the case may be, over the cross pin, the remaining unfiled teeth will come in the right position for the file.

Projecting from the base frame D' is a lug i' upon whose upper surface is attached adjustably a small plate i² having its outer end forked and provided with turned over ends i³ forming bearings for a pintle, beneath which a downwardly curved central portion of a trip i⁴ fits, the forward end of the trip turned downward as at i⁵ and adapted to fit into one of the notches h², while the other end i⁶ runs backward and upward, as shown. A spring i⁷ is arranged as shown to hold the part i⁵ downward into one of the notches h² in the strip K. As before stated channels h' are formed in the upper surface of the bar A' alongside the strip K to permit the end i⁵ to pass down home into the notches h² in the strip K. By pressing downward upon the rear end i⁶ the front end i⁵ can be elevated out of the notch, and the base plate D' and its attachments moved along the clamp bars the distance of two teeth of the saw, when the point i⁵ will drop into the next notch h², and so on. The notched strips will be made removable, so that strips with different sizes of spaces between their notches corresponding to the teeth of different grades of saws can be placed in the slot. Thus by providing a number of the notched plates with assorted notches for each machine, one machine can be employed to file all the different grades of saws.

The swiveled guide frame E' will be provided with means, such as a spring catch or bolt L', fitting into perforations in the base frame D', to hold the holder guide frame at any desired angle with relation to the saw teeth.

Attached to one of the clamp bars A' are two standards with their surfaces flush with the face of the clamp bars and projecting downward and formed with a slot in which a sliding plate is secured upon which the lower edge of the saw is adapted to rest. Two of these standards will be employed on each machine, but only one is shown, as that is sufficient for the purpose of illustration.

In the drawings M' represents the standard secured to the inner side of the clamp bar A', and with a slot $n'$ in which the plate $M^2$ is adapted to slide and be held in any required position by a screw and nut $n^2$, or by other means, by which it may be secured in place and adjusted to fit the lower edge of the saw, as shown, to hold the saw properly in place until clamped in the vise.

When placing the saw in the clamping frame care should be taken to so adjust it that the bottoms of the teeth, (which are the standards by which saws are filed,) are uniform in height above the line of the clamps, or the line of travel of the file holding mechanism, and to insure this uniformity of position two small spring gages are arranged upon the clamps at a distance apart somewhat less than the length of the shortest saw to be filed. Only one of these gages is shown, as that is sufficient for the purpose of illustration. Each of the gages consists of a small spring steel wire rod $m'$ having its upper end $m^2$ turned off at right angles and with the lower edges of the turned over end flattened or "knife edged," so that it will fit down into the teeth of the saw, as shown. The shank portion $m'$ of the gage passes downward through sockets $t'$ $t^2$ formed on the upper ends of the standards M', (or in separate sockets if preferred,) and with heads or enlargements $m^3$ on its lower end to prevent it from being removed from the sockets. The clamp bar is cut out sufficiently to permit the gage to drop down out of the way when not in use. The gage $m'$ should be set to correspond with the notches $h^2$ in the strip K, so that when the saw is set in place the teeth and notches agree as to their relative locations. When the saw is to be inserted the gages are elevated and the saw set up until the bottoms of two teeth rest against the under sides or knife edges of the gages. The plates $M^2$ are then adjusted until they rest in contact with the lower edge of the saw. The clamp bars with the saw between them are then secured firmly in the vise or other holder. The gages $m'$ are then forced backward out of the saw teeth and turned one fourth around and dropped down out of the way until required again for another saw. The swivel frame E' is then adjusted to the proper angle to correspond with the angle at which the saw teeth are to be cut, if the saw is a cross cut saw, as shown in Fig. 9, or left at right angles to the saw, as in Fig. 1, if the teeth are to be filed square across the saw, as in rip saws, band saws, and similar saws. The sliding frame D' is then adjusted until the end $i^5$ of the spring catch is in the proper notch $h^2$ in the strip K to bring the file G, when the file holder is in place, above the first tooth at one end of the saw. The file holder F' with the file properly secured and adjusted therein is then set into its guides in the frame E' and moved back and forth across the teeth until the file has cut its way down and until the holder is stopped by the ribs $c'$ on the holder resting upon the upper edge $c^2$ of the guide frame E'. The file holder is then removed and the end $i^6$ of the spring catch depressed to release the base frame D', and the latter moved along until the end $i^5$ catches in the next notch $h^2$, which will bring the file above the third tooth, when the file holder is replaced, and another tooth filed. When the third tooth is filed the sliding frame is again adjusted and the fifth tooth filed, and so on throughout the whole length of the saw, filing every other tooth. Then the swivel frame E' is reversed in position so as to cause the file holder to assume the opposite angle, and the notched plate K moved endwise on its adjusting slot, the distance of one tooth of the saw, which will cause the file to fit the remaining unfiled teeth during the return movement of the sliding frame. Thus each tooth will be cut to exactly the same depth and be of exactly the same angle and size.

In Figs. 6, 7, and 17, 18, 19, 20 and 21, we have shown a modification in the construction, the swiveled holder guide frame being formed with an annular rim $g'$, (see Fig. 17,) and with the base frame formed in two parts P' $P^2$ with a rib $g^2$ on each to fit into the grooves $a'$ in the clamp bars A' $A^2$. The two parts P' $P^2$ of the base frame are connected at their ends by bridging pieces $P^3$ $P^4$ corresponding to the cross strips $b^3$ $b^4$ of the ocnstruction shown in Figs. 1, 2, and 3, and curved to correspond to the swiveled holder guide frame and with clamps or guards $g^3$ $g^4$ to lap over the annular rim $g'$, as shown. The circular holder guide frame is thus held in position upon the base frame, but is free to be revolved thereon. A spring bolt $L^2$ on one of the bridging pieces serves to hold the holder guide frame at any angle desired, in substantially the same manner as the spring bolt L' holds it in construction shown in Figs. 1, 2, and 3.

By forming the plate D' so that its upper surface comes flush with the upper surface of the clamp bars, and with the ribs $d'$ $d^2$ on the holder guide frame E' likewise so arranged as not to project above the surface of the base frame, the file can be set to cut down to the surface of the clamp bars, so that the saw can be set into place between the clamp bars with the lower points of the spaces between the teeth but slightly above the surface of the clamp bars. This enables us not only to clamp the saw near its upper edge, which is a very desirable feature in thin saws, but also enables us to clamp narrow band saws as readily as the wider styles of saws.

For rip saws, band saws, and other saws whose teeth are filed at right angles, the strip K may be formed with notches corresponding with each tooth of the saw. The clamp bars A' A will be formed with their adjacent surfaces hollow longitudinally, as shown in Fig. 28, so that the ends of the clamps will come first in contact with the saw, so that the positive contact with the ends is assured, and the saw thereby firmly held throughout its whole length. The clamp bars are also formed with their adjacent surfaces hollow in cross section, as shown in Fig. 30, so that the contact between the extreme upper edges of the clamp bars and the saw is assured, to prevent danger of rattling or looseness laterally when the file is in action. The clamp bars are also formed slightly wedge shaped, or converging on their outside faces from the upper toward the lower edges, so that the vise jaws will be sure to pinch the upper portions of the clamp bars tightly, and thus increase the holding force upon the upper edge of the saw blade.

Having thus described our invention, what we claim as new is—

1. In a saw filing machine, the combination of two clamps between which the saw is adapted to be held, a frame slidable along said clamps and with the central portion of its upper edges depressed to come substantially level with the upper surfaces of said clamps and provided with segmental wings level with said depressed upper edges, a file holder guide frame resting upon said slidable frame and swiveled upon said segment, and a file holder supporting the file and adapted to be moved back and forth in said swiveled holder frame, substantially as and for the purpose set forth.

2. In a saw filing machine, the combination of two clamps between which the saw is adapted to be held, a frame slidable along said clamps and with the central portions of its upper edges depressed to come substantially level with the upper surfaces of said clamps and provided with segmental wings level with said depressed upper edges, a file holder guide frame resting upon said slidable frame and swiveled upon said segments, and a file holder supporting the file and adapted to be moved back and forth in said swiveled holder frame, a strip inserted into a groove in the upper edge of one of said clamp bars so as not to project above its upper surface and with notches corresponding to the teeth of the saw, and means for temporarily connecting said slidable frame to one of the notches in said strip, substantially as and for the purpose set forth.

3. In a saw filing machine the combination of two clamp bars between which the saw is adapted to be held, a frame or plate slidable upon said clamp bars above the saw, a file holder guide frame swiveled upon said slidable plate and adapted to be adjusted to any required angle to the saw teeth, a file holder supporting the file and adapted to be moved back and forth in said adjustable holder frame, a strip inserted in a groove in the upper surface of one of said clamp bars, and provided with notches corresponding with every alternate tooth of the saw to be filed, means for connecting said slidable frame temporarily to one of the notches in said strip, and means for adjusting said strip endwise, as and for the purpose set forth.

4. In a saw filing machine, two clamp bars between which the saw is adapted to be held, in combination with hooked catches $m'$ $m^2$ supported in one of said clamp bars and adapted to fit down to the roots of the teeth of the saw, to regulate the height of the saw teeth with relation to the upper surface of the clamp bars, substantially as and for the purpose set forth.

5. In a saw filing machine the combination of two clamp bars between which the saw is adapted to be held, standards M' attached rigidly to one of said clamp bars and depending downward therefrom, and sliding plates $M^2$ upon each of said standards and adapted to be adjusted vertically thereon, to support the lower edge of the saw, substantially as and for the purpose set forth.

In testimony whereof we have hereunto set our hands in the presence of two subscribing witnesses.

GEORGE R. HUFF.
GEORGE H. VERNON.

Witnesses:
C. N. WOODWARD,
H. S. WEBSTER.